(12) United States Patent
Nagura et al.

(10) Patent No.: US 9,908,443 B2
(45) Date of Patent: Mar. 6, 2018

(54) SEAT RECLINING DEVICE

(71) Applicant: AISIN SEIKI KABUSHIKI KAISHA, Kariya-shi (JP)

(72) Inventors: Mikihito Nagura, Okazaki (JP); Atsushi Abaka, Kariya (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 13 days.

(21) Appl. No.: 15/120,353

(22) PCT Filed: Feb. 20, 2015

(86) PCT No.: PCT/JP2015/054756
§ 371 (c)(1),
(2) Date: Aug. 19, 2016

(87) PCT Pub. No.: WO2015/125911
PCT Pub. Date: Aug. 27, 2015

(65) Prior Publication Data
US 2017/0066348 A1 Mar. 9, 2017

(30) Foreign Application Priority Data
Feb. 24, 2014 (JP) ................................. 2014-033328

(51) Int. Cl.
*B60N 2/235* (2006.01)
*B60N 2/12* (2006.01)

(52) U.S. Cl.
CPC ............. *B60N 2/2356* (2013.01); *B60N 2/12* (2013.01); *B60N 2/235* (2013.01)

(58) Field of Classification Search
CPC ......... B60N 2/2356; B60N 2/12; B60N 2/235
See application file for complete search history.

(56) References Cited

U.S. PATENT DOCUMENTS 9,623,774 B2 * 4/2017 Yamada ............... B60N 2/2227
2011/0012414 A1 1/2011 Yamada et al.
(Continued)

FOREIGN PATENT DOCUMENTS

JP 2013-229 A 1/2013

OTHER PUBLICATIONS

International Search Report dated May 19, 2015 in PCT/JP2015/054756 Filed Feb. 20, 2015.
(Continued)

*Primary Examiner* — Philip F Gabler
(74) *Attorney, Agent, or Firm* — Oblon, McClelland, Maier & Neustadt, L.L.P.

(57) ABSTRACT

A seat reclining device includes a first bracket, a second bracket, a cam, and pawls moved in a radial direction and engaged with the second bracket. The pawls include outer teeth engageable with the second bracket. The second bracket includes an outer circumferential wall including inner teeth engaged with the outer teeth, and an inner circumferential portion. At least one of the pawls includes a first block and a second block shifted in an axial direction from the first block. The second block is formed integrally with the first block. The first block includes the outer teeth and a cam surface that contacts the cam. The second block includes a restriction surface that contacts the inner circumferential portion when the pawl moves toward the outer side. The cam surface and the restriction surface have the same planar structure.

6 Claims, 6 Drawing Sheets

(56) References Cited

U.S. PATENT DOCUMENTS

| | | | | |
|---|---|---|---|---|
| 2011/0115271 A1* | 5/2011 | Yamada | ............... | B60N 2/2356 |
| | | | | 297/367 P |
| 2013/0161994 A1 | 6/2013 | Ito | | |
| 2014/0103693 A1* | 4/2014 | Yamada | ............... | B60N 2/2356 |
| | | | | 297/354.12 |
| 2014/0225409 A1* | 8/2014 | Nagura | ................ | B60N 2/2356 |
| | | | | 297/354.1 |
| 2014/0284984 A1* | 9/2014 | Yamada | ............... | B60N 2/2358 |
| | | | | 297/366 |
| 2015/0239371 A1* | 8/2015 | Nagura | ................ | B60N 2/2236 |
| | | | | 297/366 |

OTHER PUBLICATIONS

U.S. Appl. No. 15/120,332, filed Aug. 19, 2016, Mikihito Nagura, et al.

* cited by examiner

SEAT RECLINING DEVICE

TECHNICAL FIELD

The present invention relates to a seat reclining device.

BACKGROUND ART

Patent document 1 describes an example of a seat reclining device that fixes a seatback to a seat cushion of a seat at a predetermined angle.

A seat reclining device includes a first bracket that is coupled to the seat cushion, a cam that is rotated relative to the first bracket, pawls moved in the radial direction of the first bracket by the rotation of the cam, and a second bracket that is coupled to the seatback and rotated relative to the first bracket. The rotation of the cam moves the pawls toward the outer side in the radial direction so that the outer teeth of each pawl engages with the inner teeth on the outer circumferential wall of the second bracket and restricts rotation of the second bracket. This keeps the rotation angle of the second bracket relative to the first bracket at a predetermined angle.

The seat reclining device described in patent document 1 includes a lock restriction mechanism that separates the outer teeth of each pawl from the inner teeth of the second bracket and keeps the outer teeth of each pawl disengaged from the inner teeth of the second bracket.

The lock restriction mechanism has the structure described below.

The second bracket has a central portion, which includes a recess, and an inner circumferential portion, which extends in the circumferential direction in the recess. Each pawl includes a first block and a second block that are arranged in different stages. The first block is located toward the radially outer side of the second block, and the radially outer end surface of the first block includes outer teeth. The radially outer end surface of the second block is configured to contact, when the pawls move toward the outer side in the radial direction, the inner circumferential portion of the second bracket before the outer teeth of the pawls engage the inner teeth of the second bracket. This structure restricts movement of the pawls in the radial direction and keeps the outer teeth of the pawls disengaged from the inner teeth of the second bracket.

PRIOR ART DOCUMENT

Patent Document

Patent Document 1: Japanese Laid-Out Patent Publication No. 2013-229

SUMMARY OF THE INVENTION

Problems that are to be Solved by the Invention

The seat reclining device including the lock restriction mechanism uses pawls having a different-stage structure. Thus, the pawls are formed through forging. However, the formation of the pawls through forging takes time. Therefore, improvements are desired.

It is an object of the present invention to provide a seat reclining device that can be manufactured relatively easily.

Means for Solving the Problem

To solve the above problem, a seat reclining device includes a first bracket, a second bracket that is rotatable relative to the first bracket, a cam that is rotatable relative to the first bracket, and pawls moved in a radial direction of the first bracket and engaged with the second bracket by rotation of the cam. The pawls include outer teeth that are engageable with the second bracket. The second bracket includes an outer circumferential wall, which includes inner teeth that are engaged with the outer teeth of the pawls, and an inner circumferential portion, which extends in a circumferential direction and is located toward an inner side in a radial direction from the outer circumferential wall. At least one of the pawls includes a first block that is arranged toward an outer side in the radial direction and a second block that is arranged toward an inner side in the radial direction and located at a position shifted in an axial direction of the cam from the first block. The second block is formed integrally with the first block. The first block has a radially outer end surface including the outer teeth. The first block has a radially inner end surface including a cam surface that contacts the cam. The second block has a radially outer end surface including a restriction surface that contacts the inner circumferential portion when the pawl moves toward the outer side in the radial direction. The cam surface and the restriction surface have the same planar structure.

Further, a seat reclining device that solves the above problem includes a first bracket, a second bracket that is rotatable relative to the first bracket, a cam that is rotatable relative to the first bracket, and pawls moved in a radial direction of the first bracket and engaged with the second bracket by rotation of the cam. The pawls include outer teeth that are engageable with the second bracket. The second bracket includes an outer circumferential wall, which includes inner teeth that are engaged with the outer teeth of the pawls, and an inner circumferential portion, which extends in a circumferential direction and is located toward an inner side in a radial direction from the outer circumferential wall. At least one of the pawls includes a first block that is arranged toward an outer side in the radial direction and a second block that is arranged toward an inner side in the radial direction. The first block has a radially outer end that includes the outer teeth. The first block has a radially inner end surface including a cam surface that contacts the cam. The second block has a radially outer end including a restriction surface that contacts the inner circumferential portion when the pawl moves toward the outer side in the radial direction. The cam surface and the restriction surface have the same planar structure. Regions located at two opposite circumferential sides of a circumferentially middle region of the cam surface each have a cam function. The circumferentially middle region of the cam surface is without a cam function. The restriction surface includes a region corresponding to the circumferential middle region of the cam surface and configured as a portion that contacts the inner circumferential portion.

EMBODIMENTS OF THE INVENTION

One embodiment of a seat reclining device 20 will now be described with reference to FIGS. 1 to 12.

Figure 1:
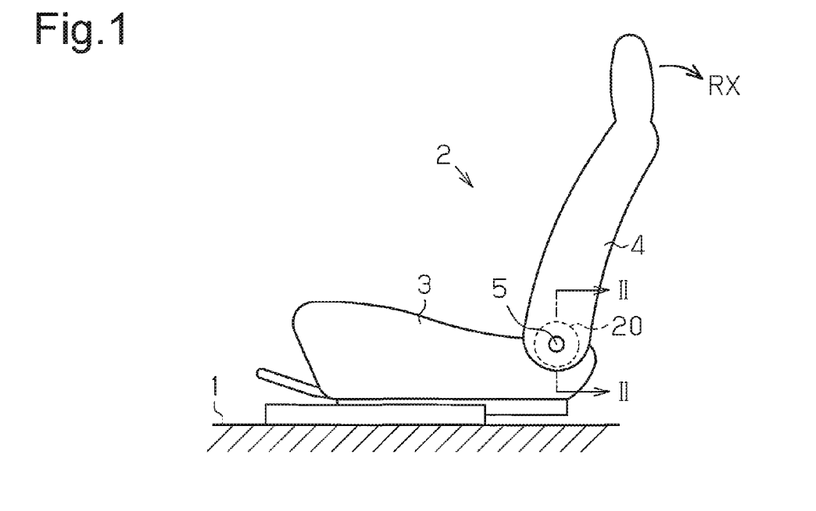
FIG. 1 is a side view of a seat including one embodiment of a seat reclining device.

As shown in FIG. 1, the seat reclining device 20 is applied to a seat 2 that is arranged on, for example, a vehicle floor 1. For example, the seat 2 includes a seat cushion 3 and a seatback 4, and the seatback 4 is pivotal relative to the seat cushion 3 and can be maintained at a predetermined angle relative to the seat cushion 3.

The seatback 4 is coupled to the seat cushion 3 by the seat reclining device 20. The seat reclining device 20 maintains the seatback 4 at a predetermined angle relative to the seat cushion 3.

Figure 2:
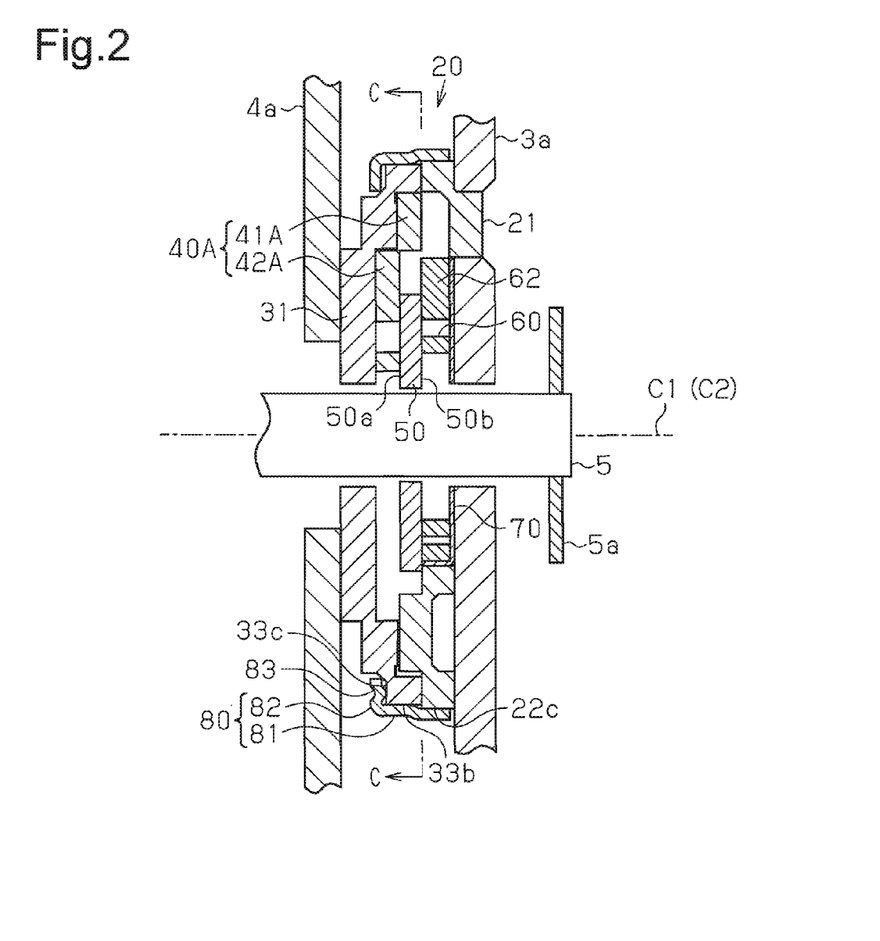
FIG. 2 is a cross-sectional view taken along line II-II in FIG. 1.

A plate 3a shown in FIG. 2 is coupled to the seat cushion 3, and a plate 4a shown in FIG. 2 is coupled to the seatback 4. As shown in FIG. 2, the seat reclining device 20 includes rotors (first and second brackets 21 and 31 that will be described later), one of which is fixed to the plate 3a and the other of which is fixed to the plate 4a. In this embodiment, as shown in FIG. 2, the first bracket 21 is fixed to the plate 3a, and the second bracket 31 is fixed to the plate 4a.

As shown in FIGS. 1 and 2, a shaft 5 is inserted through the central portion of the seat reclining device 20. The shaft 5 actuates a cam mechanism located in the seat reclining device 20. An operation lever 5a is coupled to one end of the shaft 5 to rotate the shaft 5.

When the seat reclining device 20 is coupled to the seat 2, the rotation axis C1 of the shaft 5 coincides with the rotation axis C2 of the seat reclining device 20 (rotation axes of first bracket 21 and second bracket 31).

In the description hereafter, the direction extending around the rotation axis C2 of the seat reclining device 20 is referred to as the circumferential direction, and a direction orthogonal to the rotation axis C2 (normal direction) is referred to as the radial direction. When inclining the seatback 4 toward the rear, the direction in which the second bracket 31 rotates is referred to as the reverse rotation direction RX.

Figure 3:
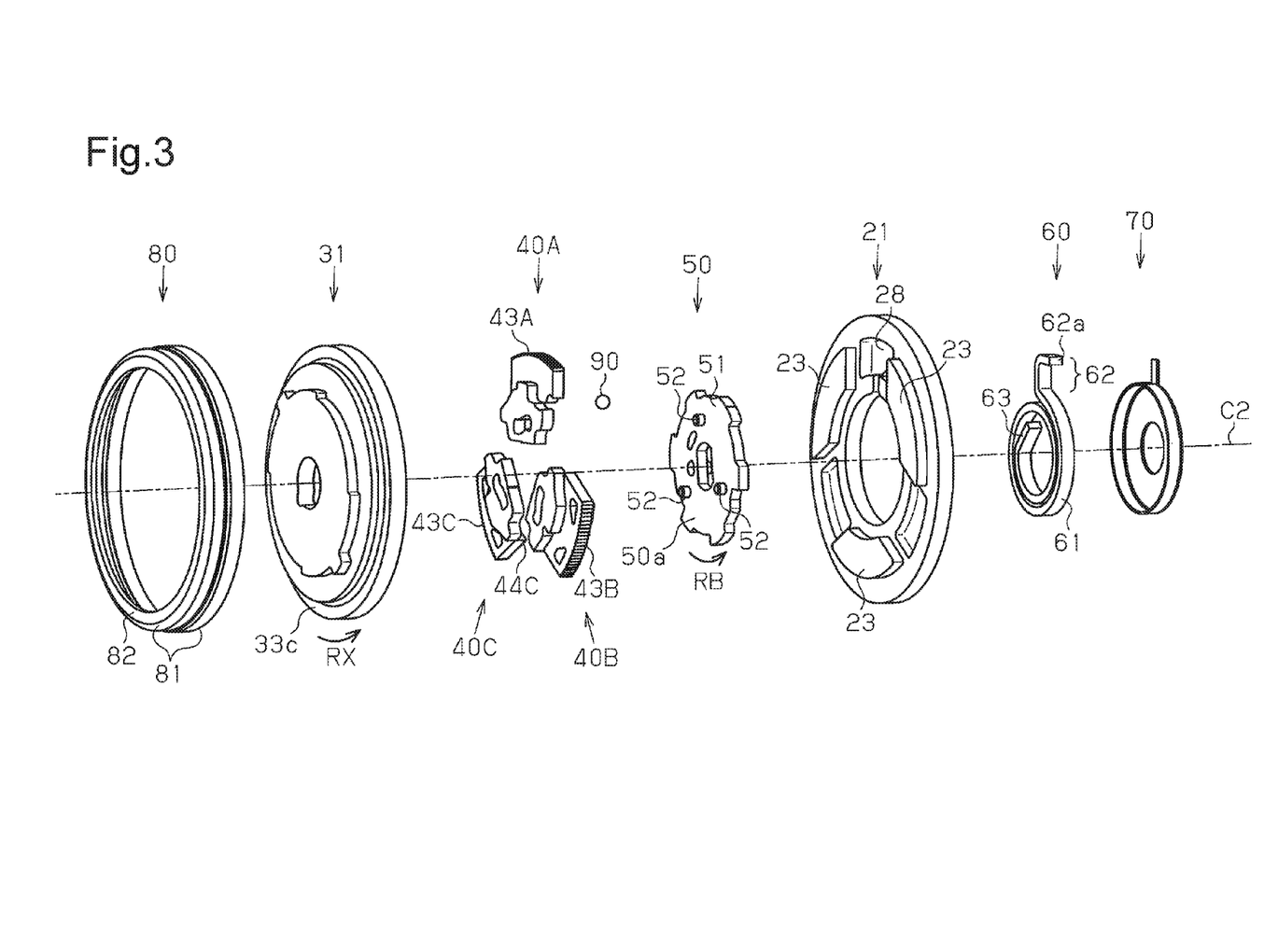
FIG. 3 is an exploded perspective view of the seat reclining device shown in FIG. 2.

With reference to FIG. 3, the structure of the seat reclining device 20 will now be described.

As shown in FIG. 3, the seat reclining device 20 includes the first bracket 21, the second bracket 31, first to third pawls 40A to 40C, a cam 50, a spiral spring 60 that biases the cam 50, a cover 70 arranged around the spiral spring 60, and a retainer 80 that holds the first and second brackets 21 and 31. The seat reclining device 20 includes a ball cam 90 to restrict excessive movement of the first pawl 40A. The cam mechanism is formed by the cam 50, the spiral spring 60, the first to third pawls 40A to 40C, and the ball cam 90.

Figure 4A:
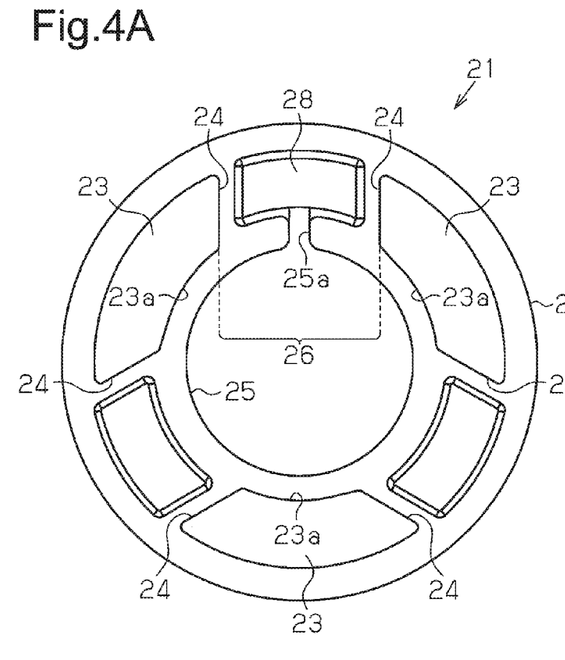
FIG. 4A is a plan view of a first bracket shown in FIG. 3.
Figure 4B:
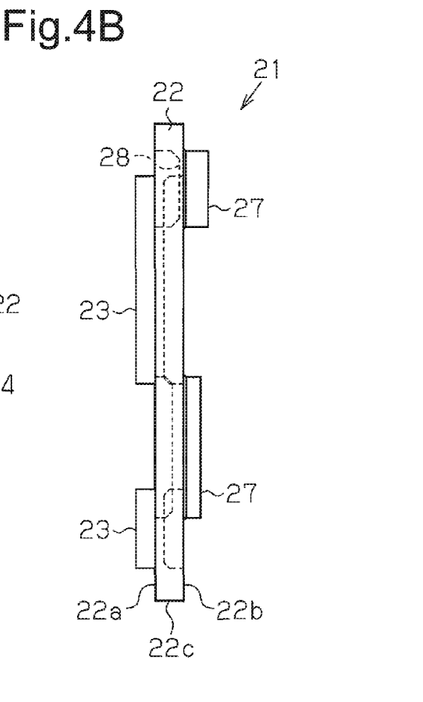
FIG. 4B is a side view of FIG. 4A.

With reference to FIGS. 4A and 4B, the first bracket 21 will now be described.

As shown in FIGS. 4A and 4B, the first bracket 21 includes a disk-shaped main body 22, three guides 23 that guide the movement of the pawls 40A, 40B, and 40C, and projections 27 used to couple the first bracket 21 to a fixed member (e.g., plate 3a).

As shown in FIGS. 3 and 4B, the main body 22 includes an inner surface 22a that opposes the second bracket 31. The guides 23 project from the inner surface 22a of the main body 22.

As shown in FIGS. 2 and 4A, each guide 23 includes an inside surface 23a and two guide surfaces 24, which extend toward the outer side in the radial direction from the two circumferential ends of the inside surface 23a. The region surrounded by the inside surfaces 23a of the three guides 23 accommodate the cam 50.

The two opposing guide surfaces 24 of two adjacent guides 23 are parallel to each other. The opposing guide surfaces 24 cooperate with the inner surface 22a of the main body 22 to form a guide groove 26. The guide grooves 26 guide the pawls 40A, 40B, and 40C that move in the radial direction.

The three guides 23 are identical in shape and arranged at equal intervals in the circumferential direction. That is, the three guide grooves 26 are arranged at equal intervals in the circumferential direction. The surface at the opposite side of the guides 23 (outer surface 22b of main body 22) includes sunken portions in correspondence to the guides 23.

The projections 27 project from the surface at the opposite side of the guides (outer surface 22b of main body 22). The surface at the opposite of the projections 27 (inner surface 22a of first bracket 21) are sunken at locations corresponding to the projections 27. One of the sunken portions located at the opposite sides of the projections 27 functions as an accommodation recess 28 that accommodates an end 62a of the spiral spring 60.

When coupling the first bracket 21 to the fixed member (e.g., plate 3a), the projections 27 are fitted into holes or slots of the fixed member. The projections 27 are then welded to the fixed member.

The central portion of the main body 22 defines an accommodation portion 25 that accommodates a spiral portion 61 of the spiral spring 60.

A communication groove 25a connects the accommodation portion 25 to the accommodation recess 28 of the first bracket 21. The spiral spring 60 includes an outer engagement portion 62 (refer to FIG. 3) engaged with a region extending over the communication groove 25a and the accommodation recess 28.

Stamping is performed to form the first bracket 21.

For example, stamping is performed on a metal plate using a set of dies to form the guides 23, the sunken structures at the opposite side of the guides 23, the projections 27, and the sunken structures at the opposite side of the projections 27.

Figure 5:
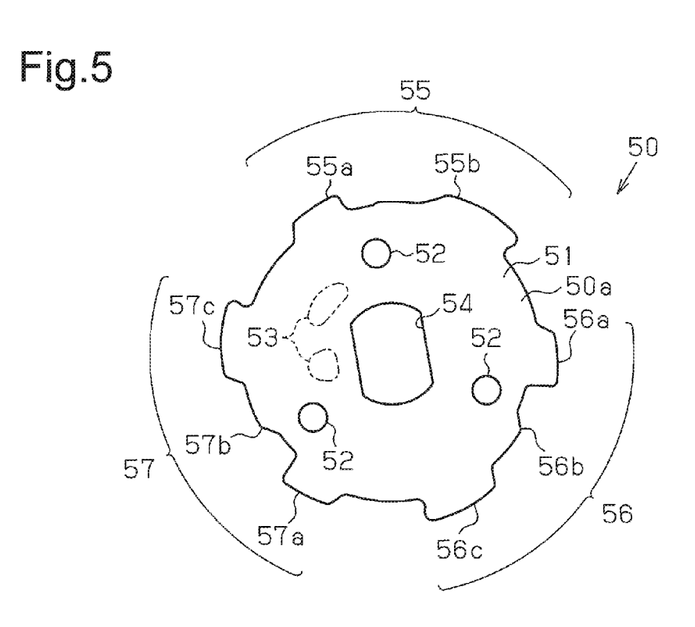
FIG. 5 is a plan view of a cam shown in FIG. 3.

The structure of the cam 50 will now be described with reference to FIG. 5.

The cam 50 is located between the first and second brackets 21 and 31 (refer to FIG. 2). Further, the cam 50 is accommodated in a region surrounded by the inner surfaces 23a of the three guides 23 of the first bracket 21.

The cam 50 includes a cam body 51, three pawl engagement portions 52, and two spring engagement portions 53. The three pawl engagement portions 52 are respectively engaged with the first to third pawls 40A to 40C. The two spring engagement portions 53 are engaged with an inner engagement portion 63 of the spiral spring 60 (refer to FIG. 3). Each pawl engagement portion 52 projects from one surface (first surface 50a) of the cam 50, and each spring engagement portion 53 is arranged on the other surface (second surface 50b) of the cam 50 (refer to FIG. 2).

The central portion of the cam body 51 includes a fitting hole 54. The shaft 5 is fitted to the fitting hole 54. The cam 50 moves in cooperation with the rotation of the shaft 5. More specifically, operation of the operation lever 5a, which is coupled to the shaft 5, rotates the cam 50.

The circumferential surface of the cam body 51 includes three cam portions (hereafter referred to as the first cam portion 55, the second cam portion 56, and the third cam portion 57) that are arranged at equal angular intervals. The cam portions 55 to 57 respectively contact cam surfaces 44A to 44C of the pawls 40A to 40C, which will be described later.

The first cam portion 55 includes two pushing sections 55a and 55b (hereinafter referred to as the first pushing section 55a and the second pushing section 55b) that push the first cam surface 44A of the first pawl 40A.

The second cam portion 56 includes three pushing sections 56a, 56b, and 56c that push the second cam surface 44E of the second pawl 40E.

The third cam portion 57 includes three pushing sections 57a, 57b, and 57c that push the third cam surface 44C of the third pawl 40C. The third cam portion 57 has the same structure as the second cam portion 56.

The spiral spring 60 biases the cam 50 in a predetermined rotation direction (hereafter referred to as the biasing direction RB) relative to the first bracket 21. That is, basing force is applied to rotate the cam 50 in the biasing direction RB.

Figure 6:
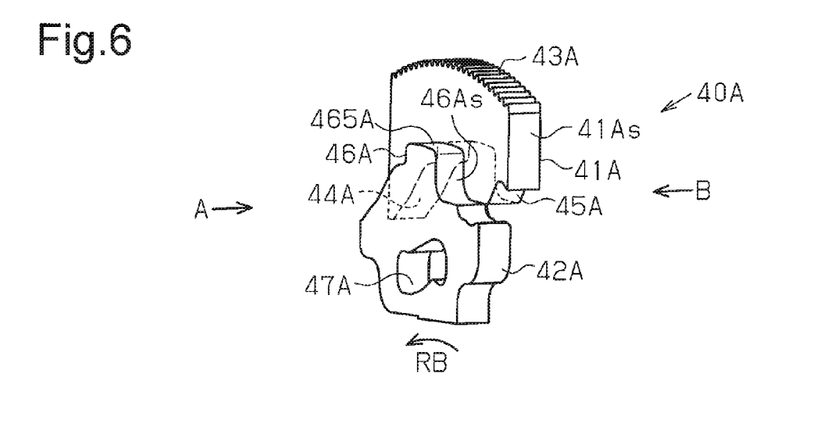
FIG. 6 is a perspective view of a first pawl shown in FIG. 3.
Figure 7A:
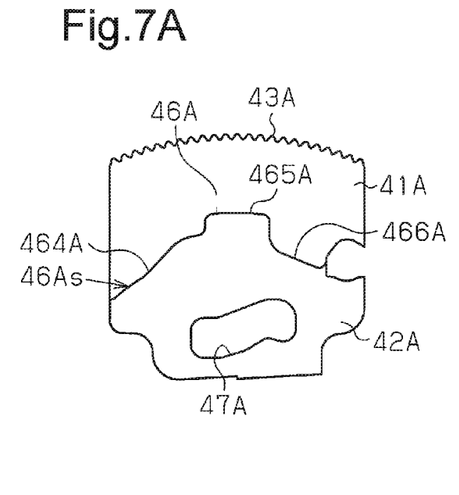
FIG. 7A is a plan view of the first pawl shown in FIG. 6.
Figure 7B:
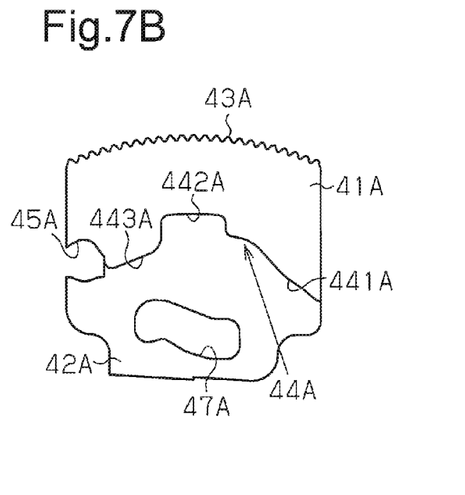
FIG. 7B is a rear view of FIG. 7A.

With reference to FIGS. 6, 7A, and 7B, the first pawl 40A will now be described.

FIG. 6 is a perspective view of the first pawl 40A, FIG. 7A is a view taken in the direction of arrow A in FIG. 6, and FIG. 7B is a view taken in the direction of arrow B in FIG. 6.

The first pawl 40A includes a first block 41A and a second block 42A that are arranged in different stages. More specifically, the first block 41A is arranged toward the outer side in the radial direction, and the second block 42A is arranged toward the inner side in the radial direction (refer to FIG. 2). The second block 42A is also shifted from the first block 41A in the direction of the rotation shaft C2 (axial direction).

The first block 41A is attached to a guide groove 26.

The first block 41A is arranged at the same position as the cam 50 in the direction of the rotation axis C2 (refer to FIG. 2).

The first block 41A has a radially outer end surface (end surface opposing inner teeth 37 of second bracket 31, which will be described later) that is configured to be arcuate and includes outer teeth 43A that are engaged with the inner teeth 37 of the second bracket 31.

The first block 41A has a radially inner end surface (end surface opposite to radially outer end surface) that defines a first cam surface 44A, which contacts the first cam portion 55 of the cam 50.

The first cam surface 44A includes three regions that are continuous in the circumferential direction (hereinafter, referred to as the first region 441A, the second region 442A, and the third region 443A).

The first pushing section 55a of the first cam portion 55 contacts the first region 441A. The first pushing section 55a and the second pushing section 55b of the first cam portion 55 substantially do not contact the second region 442A. The second pushing section 55b of the first cam portion 55 contacts the third region 443A.

Further, the radially inner end surface of the first block 41A includes a concavity 45A that is continuous from the first cam surface 44A and accommodates the ball cam 90. The ball cam 90 is accommodated in a ball cam accommodation compartment formed by the concavity 45A of the first pawl 40A, the first cam portion 55 of the cam 50, and the guide surface 24 of the guide 23 (refer to FIG. 10).

The second block 42A is arranged opposing the first surface 50a of the cam 50. That is, the second block 42A is arranged between the cam 50 and the second bracket 31 in the direction of the rotation axis C2 (refer to FIG. 2). The second block 42A is arranged so that the radially outer end surface of the second block 42A opposes an outer circumferential portion 35 or an inner circumferential portion 36 of the second bracket 31 (refer to FIG. 9A), which will be described later.

The radially outer end surface of the second block 42A defines a restriction portion 46A that contacts the inner circumferential portion 36 of the second bracket 31 and restricts movement of the first pawl 40A toward the outer side in the radial direction.

The restriction portion 46A includes a restriction surface 46As having the same planar structure as the first cam surface 44A. More specifically, the restriction surface 46As includes three regions that are continuous in the circumferential direction (hereinafter, referred to as the fourth region 464A, the fifth region 465A, and the sixth region 466A).

The fourth region 464A has a planar structure that corresponds to the first region 441A of the first cam surface 44A. The fifth region 465A has a planar structure that corresponds to the second region 442A of the first cam surface 44A. The sixth region 466A has a planar structure that corresponds to the third region 443A of the first cam surface 44A.

The fifth region 465A is shaped in conformance with an inner circumferential surface 36a of the inner circumferential portion 36 of the second bracket 31. In accordance with the position of the first pawl 40A in the radial direction, the fifth region 465A comes into contacts with the inner circumferential portion 36 of the second bracket 31 or is separated from the inner circumferential portion 36.

The fourth region 464A and the sixth region 466A are located toward the inner side in the radial direction from the fifth region 465A. Thus, regardless of the radial position of the first pawl 40A, the fourth region 464A and the sixth region 466A do not contact the inner circumferential portion 36 of the second bracket 31.

The restriction surface 46As and the first cam surface 44A are located at the same position in the longitudinal direction of the first pawl 40A (radial direction of first pawl 40A). The phrase "located at the same position" refers to the positional relationship of two surfaces formed by a male die and a female die in correspondence with the engaged portion of the male die and the female die when forming a structure having different stages through a semi-drawn stamping process.

A cam hole 47A extends in the thickness-wise direction through the central portion of the second block 42A. The cam hole 47A is configured to be elongated in the circumferential direction and extended in the biasing direction RB toward the inner side in the radial direction (refer to FIG. 6). One of the pawl engagement portions 52 of the cam 50 is inserted into the cam hole 47A.

Stamping is performed on the first pawl 40A to integrally form the first block 41A and the second block 42A.

For example, a metal plate is stamped using a set of dies to form the first cam surface 44A of the first block 41A and the restriction surface 46As of the second block 42A.

Figure 8:
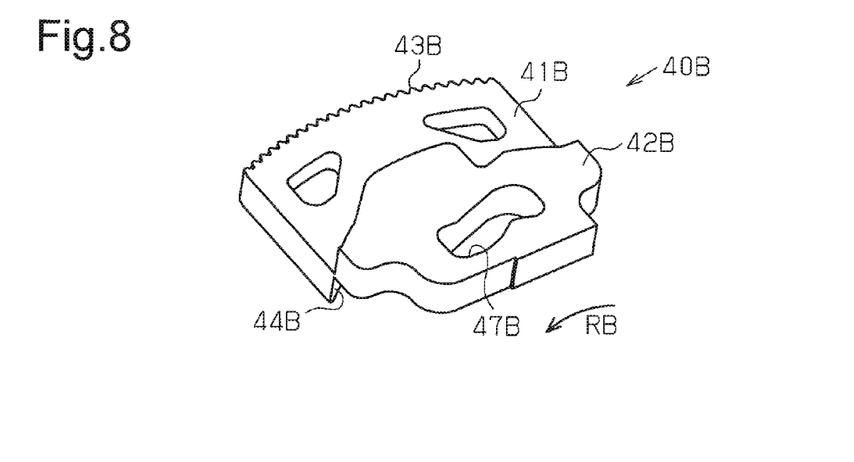
FIG. 8 is a perspective view of a second pawl shown in FIG. 3.

With reference to FIG. 8, the second pawl 40B will now be described.

The second pawl 40B includes a first block 41B and a second block 42B that are arranged in different stages. The first block 41B is arranged toward the outer side in the radial direction, and the second block 42B is arranged toward the inner side in the radial direction.

The first block 41B is attached to a guide groove 26.

The first block 41B is arranged at the same position as the cam 50 in the direction of the rotation axis C2.

The first block 41B has a radially outer end surface (end surface opposing inner teeth 37 of second bracket 31) that is configured to be arcuate and includes outer teeth 43A that are engaged with the inner teeth 37 of the second bracket 31. The first block 41b has a radially inner end surface (end surface opposite to radially outer end surface) that defines a second cam surface 44B, which contacts the second cam portion 56 of the cam 50.

The second block 42B is arranged opposing the first surface 50a of the cam 50. That is, the second block 42A is arranged between the cam 50 and the second bracket 31 in the direction of the rotation axis C2.

A cam hole 47B extends in the thickness-wise direction through the central portion of the second block 42A. The cam hole 47B is configured to be elongated in the circumferential direction and extended in the biasing direction RE toward the inner side in the radial direction (refer to FIG. 10). One of the pawl engagement portions 52 of the cam 50 is inserted into the cam hole 47B.

The second bracket 31 will now be described with reference to FIGS. 9A and 9B.

Figures 9A, 9B:
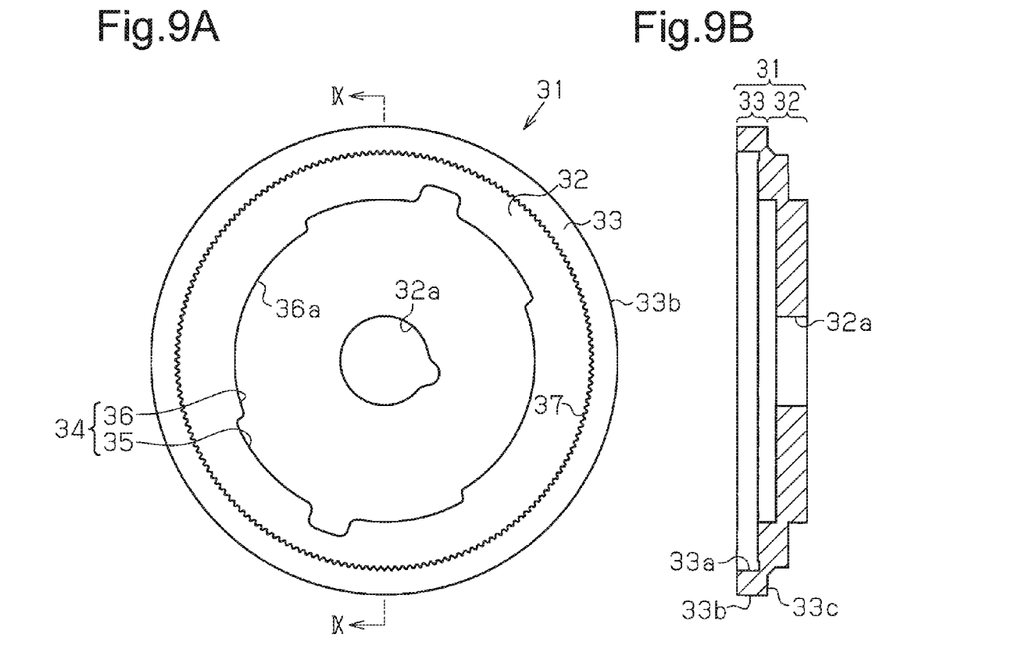
FIG. 9A is a plan view of the second bracket shown in FIG. 3.
FIG. 9B is a cross-sectional view taken along line IX-IX in FIG. 9A.

As shown in FIGS. 9A and 9B, the second bracket 31 includes a main body 32 and an outer circumferential wall 33. The main body 32 is disk-shaped and includes an insertion hole 32a through which the shaft 5 is inserted. The outer circumferential wall 33 extends from the outer edge of the main body 32 toward the outer side in the radial direction.

The outer circumferential wall 33 has an inner circumferential surface 33a. The inner teeth 37 are arranged on the entire circumference of the inner circumferential surface 33a and engage the outer teeth 43A to 43C of the first to third pawls 40A to 40C.

The outer circumferential wall 33 has an outer circumferential surface 33b that comes into contact with and slides on the retainer 80. The outer circumferential wall 33 has an outer surface 33c that comes into contact with and slides on a projection 83 of the retainer 80 (refer to FIG. 2), which will be described later.

The central portion of the main body 32 includes a circular recess 34.

The recess 34 includes a plurality of outer circumferential portions 35, each having a circumferential surface of a predetermined first radius, and a plurality of inner circumferential portions 36, each having a circumferential surface of a second radius that is smaller than the first radius. That is, when a circumferential surface having the same first radius as the outer circumferential portion 35 serves as a reference surface, each inner circumferential portion 36 projects toward the inner side in the radial direction from the reference surface. That is, each inner circumferential portion 36 extends in the circumferential direction radially inward from the outer circumferential portions 35.

The structure of each outer circumferential portion 35 will now be described.

Figure 10:
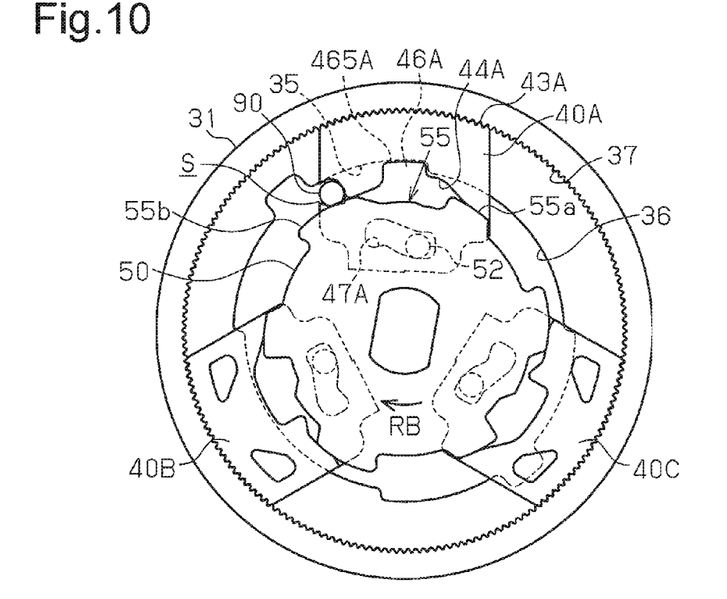
FIG. 10 is a schematic diagram showing the seat reclining device in a locked state.

Referring to FIG. 10, the circumferential surface of the outer circumferential portion 35 is located toward the outer side in the radial direction from where the fifth region 465A of the restriction portion 46A of the first pawl 40A is located when the first pawl 40A is moved to the radially outermost position (i.e., when outer teeth 43A of first pawl 40A is engaged with inner teeth 37 of second bracket 31).

Thus, when the rotation of the second bracket 31 arranges the outer circumferential portion 35 at a location corresponding to the restriction portion 46A of the first pawl 40A, there is no restriction to the movement of first pawl 40A in the radial direction. Thus, when the outer circumferential portion 35 is located at this position, the first pawl 40A is also allowed to move toward the radially outermost position.

The structure of each inner circumferential portion 36 will now be described.

Referring to FIG. 10, the circumferential surface of the inner circumferential portion 36 is located toward the inner side in the radial direction from where the fifth region 465A of the restriction portion 46A of the first pawl 40A is located when the first pawl 40A is moved to the radially outermost position (i.e., when outer teeth 43A of first pawl 40A is engaged with inner teeth 37 of second bracket 31).

Thus, when the rotation of the second bracket 31 arranges the inner circumferential portion 36 at a location corresponding to the restriction portion 46A of the first pawl 40A, the restriction portion 46A of the first pawl 40A contacts the inner circumferential portion 36. When the inner circumferential portion 36 is located at this position, movement of the first pawl 40A toward the outer side in the radial direction is restricted.

The structure of the retainer 80 will now be described.

As shown in FIGS. 2 and 3, the retainer 80 includes an annular main body 81 and a flange 82 that extends from one of the edges of the main body 81 toward the central portion. The flange 82 includes the projection 83 that projects toward the inner side (toward second bracket 31). The projection 83 adjusts play (allowance) for movement of the second bracket 31 in the direction of the rotation axis C2.

The main body 81 of the retainer 80 surrounds the outer circumferential surface 22c of the first bracket 21 and the outer circumferential surface 33b of the second bracket 31. The main body 81 of the retainer 80 is laser-welded to the outer circumferential surface 22c of the first bracket 21. The flange 82 of the retainer 80 covers the outer surface 33c of the outer circumferential wall 33 of the second bracket 31 (refer to FIG. 2). Thus, the retainer 80 holds the first bracket 21 and the second bracket 31 maintaining the distance between the first bracket 21 and the second bracket 31 at a predetermined distance in the direction of the rotation axis C2.

Figure 11:
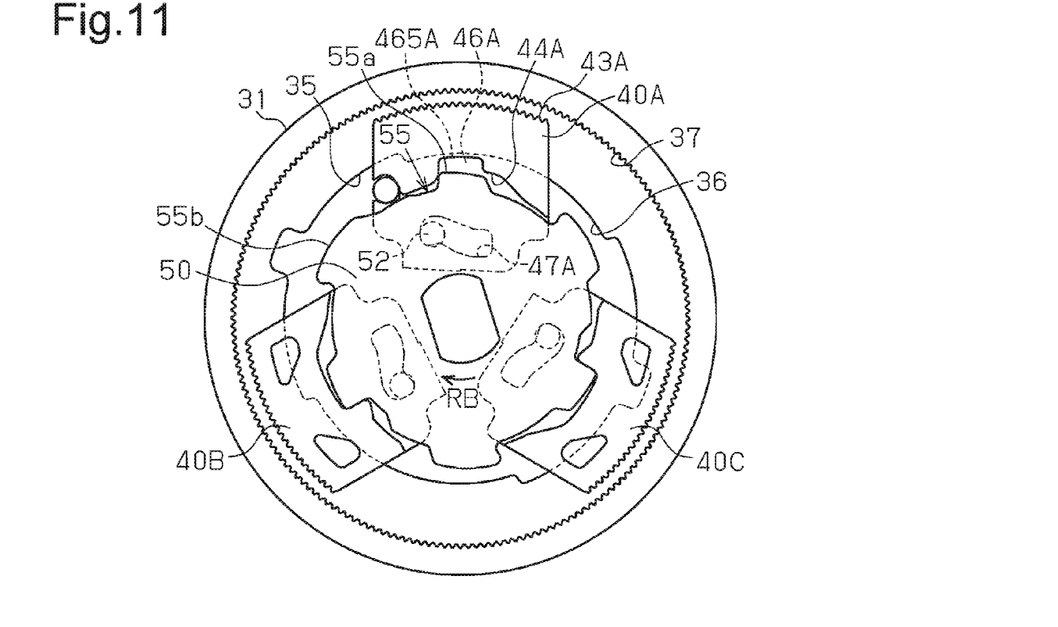
FIG. 11 is a schematic diagram showing the seat reclining device in an unlocked state.
Figure 12:
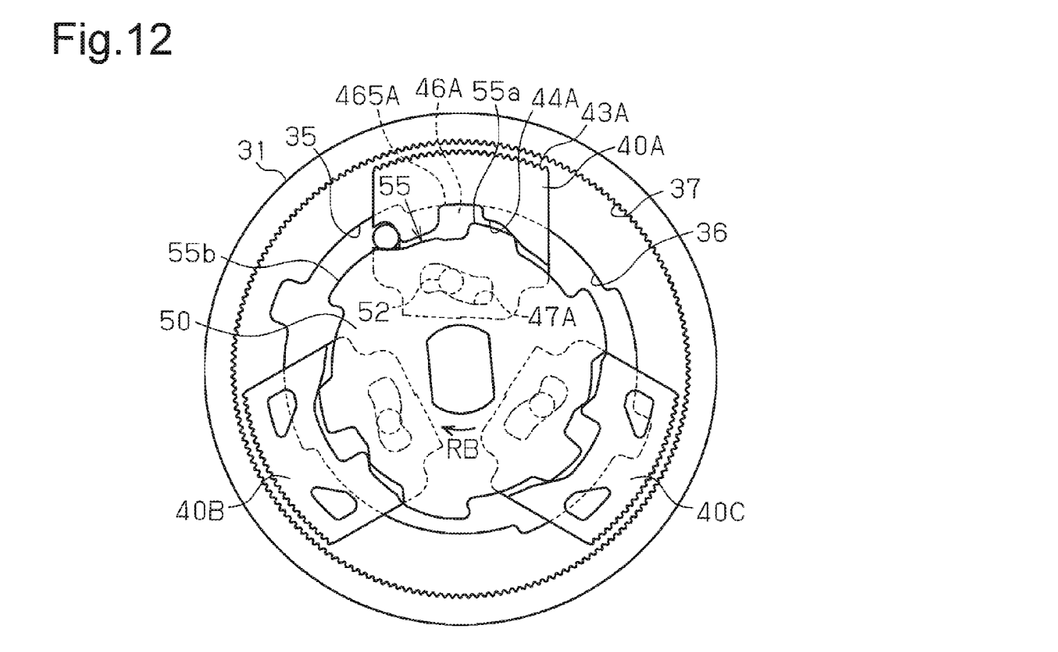
FIG. 12 is a schematic diagram showing the seat reclining device in a lock-disabled state.

With reference to FIGS. 10 to 12, the operation of the seat reclining device 20 will now be described.

FIGS. 10 to 12 are each schematic diagrams corresponding to a cross-sectional position lying along line C-C in FIG. 2 showing different operational states of the seat reclining device 20.

FIG. 10 shows the outer teeth 43A of the pawls 40A to 40C engaged with the inner teeth 37 of the second bracket 31 (hereinafter, referred to as the locked state).

FIG. 11 shows the outer teeth 43A to 43C of the pawls 40A to 40C disengaged from the inner teeth 37 of the second bracket 31 by maintaining the pawls 40A to 40C at positions located toward the inner side in the radial direction (hereinafter, referred to as the unlocked state).

FIG. 12 shows the outer teeth 43A to 43C of the pawls 40A to 40C disengaged from the inner teeth 37 of the second bracket 31 by restricting radially outward movement of the first pawl 40A (hereinafter, referred to as the lock-disabled state).

The seat reclining device 20 includes the next two basic operations.

The first basic operation is the operation of the pawls 40A to 40C resulting from the rotation of the cam 50.

The second basic operation is the restriction of movement of the pawls 40A to 40C when the second bracket 31 rotates.

An example of the first basic operation will now be described using the first pawl 40A.

The cam 50 is biased to rotate in the biasing direction RE. When the cam 50 rotates in the biasing direction RE, the first cam portion 55 pushes the first cam surface 44A of the first pawl 40A. This moves the first pawl 40A toward the outer side in the radial direction.

As shown in FIG. 10, when the outer teeth 43A of the first pawl 40A is engaged with the inner teeth 37 of the second bracket 31, the first cam portion 55 pushes the first pawl 40A toward the outer side in the radial direction. This fixes the second bracket 31 to the first bracket 21. In this state, the seat reclining device 20 is locked.

When the first cam portion 55 pushes the first cam surface 44A of the first pawl 40A, the first pushing section 55a of the first cam portion 55 pushes the first region 441A of the first cam surface 44A, and the second pushing section 55b of the first cam portion 55 pushes the third region 443A of the first cam surface 44A. That is, the first pawl 40A is pushed toward the outer side in the radial direction at two locations sandwiching the second region 442A. This stably positions the first pawl 40A and allows for smooth movement toward the outer side in the radial direction.

When the operation of the operation lever 5a rotates the cam 50 in a direction opposite to the biasing direction RE, the wall surface of the cam hole 47A is pushed by the corresponding pawl engagement portion 52 of the cam 50. This moves the first pawl 40A toward the inner side in the radial direction.

As shown in FIG. 11, this separates the inner teeth 37 of the second bracket 31 from the outer teeth 43A of the first pawl 40A. Thus, the second bracket 31 becomes rotatable relative to the first bracket 21. In this state, the seat reclining device 20 is unlocked.

The second basic operation will now be described.

As shown in FIG. 12, if the operation lever 5a is released when the inner circumferential portion 36 of the second bracket 31 is located at a position corresponding to the restriction portion 46A of the first pawl 40A, the cam 50 rotates in the biasing direction RB. The rotation of the cam 50 moves the first pawl 40A toward the outer side in the radial direction. However, the restriction portion 46A of the first pawl 40A contacts the inner circumferential portion 36. This restricts movement of the first pawl 40A before reaching the radially outermost position. That is, movement of the first pawl 40A toward the outer side in the radial direction is restricted. This keeps the inner teeth 37 of the second bracket 31 separated from the outer teeth 43A of the first pawl 40A. Further, contact of the restriction portion 46A of the first pawl 40A with the inner circumferential portion 36 of the second bracket 31 restricts rotation of the cam 50. Thus, the other pawls (second and third pawls 40B and 40C) are also maintained in a state in which the outer teeth 43B and 43O are separated from the inner teeth 37 of the second bracket 31. In this manner, when the inner circumferential portion 36 of the second bracket 31 is located at a position corresponding to the restriction portion 46A of the first pawl 40A, the locking of the seat reclining device 20 is restricted. Thus, the seat reclining device 20 is in a state in which locking is disabled (rotation of second block 31 is allowed).

The operation of the cam mechanism in each state of the seat reclining device 20 will now be described.

In the locked state shown in FIG. 10, the seatback 4 is inclined relative to the seat cushion 3 by an angle that is within a predetermined range. In this state, the seat reclining device 20 is in a mode in which the operation lever 5a is not operated.

When the seatback 4 is inclined relative to the seat cushion 3 by an angle that is within a predetermined range, that is, when the outer circumferential portion 35 of the second bracket 31 is located at a position corresponding to the restriction portion 46A of the first pawl 40A, there is no restriction to the movement of the first pawl 40A in the radial direction.

When the operation lever 5a is not operated, that is, when force in a direction opposite to the biasing direction RB is not applied to the cam 50, the biasing force applied to the cam 50 rotates the cam 50 in the biasing direction RB. Thus, the first to third cam portions 55 to 57 respectively push the first to third cam surfaces 44A to 44C of the pawls 40A to 40C. This pushes the pawls 40A to 40C toward the outer side in the radial direction, and the outer teeth 43A of the pawls 40A to 40C engage the inner teeth 37 of the second bracket 31. Thus, the seat reclining device 20 is in the locked state.

Some of the pushing force produced by the rotation of the cam 50 is applied to the first pawl 40A by the ball cam 90. Thus, the ball cam 90 pushes the first pawl 40A and the guide 23. This limits unnecessary movement of the first pawl 40A produced in the gap between the side surface 41As of the first pawl 40A and the guide surface 24.

The unlocked state shown in FIG. 11 is the mode of the reclining device 20 when the operation lever 5a is being operated.

When the operation of the operation lever 5a rotates the cam 50 in a direction opposite to the biasing direction RB, the first basic operation moves the pawls 40A to 40C toward the inner side in the radial direction and separates the inner teeth 37 of the second bracket 31 from the outer teeth 43A to 43C of the pawls 40A to 40C. This shifts the seat reclining device 20 to the unlocked state.

In the lock disabled state shown in FIG. 12, the seat reclining device 20 is in a mode in which the seatback 4 is inclined relative to the seat cushion 3 by an angle outside the predetermined range. Further, the operation lever 5a is not being operated.

When the seatback 4 is inclined relative to the seat cushion 3 by an angle outside the predetermined range, that is, when the inner circumferential portion 36 of the second bracket 31 is located at a position corresponding to the restriction portion 46A of the first pawl 40A, the second basic operation restricts movement of the first pawl 40A toward the outer side in the radial direction. Thus, the seat reclining device 20 is in the lock-disabled state.

As described above, the seat reclining device 20 of the present embodiment has a pawl structure that differs from the prior art pawls. However, the seat reclining device 20 of the present embodiment substantially functions in the same manner as a seat reclining device including a prior art lock restriction mechanism.

In the prior art seat reclining device, a first pawl is configured so that a cam surface and a restriction surface have different planar structures. That is, a first cam surface of the prior art first pawl is configured to be S-shaped in the same manner as the second cam surface 44B of the second pawl 40E of the present embodiment and pushed by a cam at three locations. The restriction surface of the prior art first pawl is configured to have a generally reversed V-shape and include a circumferentially middle portion that projects radially outward from the second block. Thus, in the prior art first pawl, the planar structure of the first cam surface differs from the planar structure of the restriction surface.

In contrast, as described above, in the seat reclining device 20 of the present embodiment, the first cam surface 44A and the restriction surface 46As are configured to have different planar structures. That is, the first cam surface 44A and the restriction surface 46As are configured to be identical in shape.

More specifically, in the first cam surface 44A, the circumferentially middle region (i.e., second region 442A) is configured as a region that does not contact the first cam portion 55, and the regions at the two sides of the middle region (i.e., first region 441A and third region 443A) are configured as regions that contact the first cam portion 55. In the restriction surface 46As, the region corresponding to the middle region (i.e., fifth region 465A) is configured as a region that contacts the inner circumferential portion 36 of the second bracket 31, and the regions at the two sides of the middle region (i.e., fourth region 464A and sixth region 466A) are configured as regions that do not contact the inner circumferential portion 36 of the second bracket 31.

More specifically, the first cam surface 44A and the restriction surface 46As both serve as a functional region that functions in the circumferential direction and a non-functional region that does not function in the circumferential direction. Further, the first cam surface 44A and the restriction surface 46As are configured so that the function surface of the first cam surface 44A and the non-functional surface of the restriction surface 46As correspond to each other and so that the non-functional surface of the first cam surface 44A and the functional surface of the restriction surface 46As correspond to each other. That is, the first cam surface 44A and the restriction surface 46As are configured to be generally flush with each other.

Such a configuration realizes two different functions (function of first cam surface 44A and function of restriction surface 46As) with a single planar structure.

In the single planar structure, the rear side (surface directed toward inner side in radial direction) functions as the first cam surface 44A, and the front side (surface directed toward outer side in radial direction) functions as the restriction surface 46As.

The seat reclining device 20 of the present embodiment has the advantages described below.

(1) In the first pawl 40A of the above embodiment, the first cam surface 44A has the same planar structure as the restriction surface 46As of the restriction portion 46A. This configuration allows the first pawl 40A to be formed through stamping. Thus, the manufacturing of the seat reclining device 20 is relatively simple.

(2) In the above embodiment, the first cam surface 44A includes the first region 441A, the second region 442A, and the third region 443A. Further, the first region 441A and the third region 443A are configured as regions that come into contact with the first cam portion 55 of the cam 50. The restriction surface 46As of the restriction portion 46A includes the fourth region 464A corresponding to the first region 441A, the fifth region 465A corresponding to the second region 442A, and the sixth region 466A corresponding to the third region 443A. The fifth region 465A is configured as a region that contacts the inner circumferential portion 36 of the second bracket 31 when the first pawl 40A moves toward the outer side in the radial direction.

In this configuration, the first pawl 40A is pushed by the cam 50 at the first region 441A and the third region 443A, that is, at two locations sandwiching the second region 442A. Thus, in comparison with when the first pawl 40A is pushed from one side, the first pawl 40A moves more smoothly toward the outer side in the radial direction.

(3) In the above embodiment, the fifth region 465A in the restriction surface 46As of the restriction portion 46A is configured to be shaped in conformance with the inner circumferential surface 36a of the inner circumferential portion 36.

More specifically, the fifth region 465A of the restriction surface 46As comes into planar contact with the inner circumferential portion 36. Thus, the position of the first pawl 40A is stabile when the fifth region 465A in the restriction surface 46As of the restriction portion 46A contacts the inner circumferential portion 36 of the second bracket 31.

This limits unnecessary movement of the first pawl 40A (tiling relative to radial direction) when the fifth region 465A of the restriction portion 46A is in contact with the inner circumferential portion 36 of the second bracket 31. Thus, the rotation of the second bracket 31 is not interfered by unnecessary movement of the first pawl 40A.

(4) In the above embodiment, the radially inner end surface of the first block 41A of the first pawl 40A and the radially outer end surface of the second block 42A are identical in shape. Further, the two end surfaces are located at the same position in the radial direction.

In this configuration, when stamping the first pawl 40A, the cam surface 44A of the radially inner end surface and the restriction surface 46As of the radially outer end surface can be formed with more accurate dimensions than when the radially inner end surface of the first block 41A is separated from the radially outer end surface of the second block 42A.

(5) In the above embodiment, the first pawl 40A is formed through stamping.

This reduces the time for forming the first pawl 40A as compared with when forming the first pawl 40A through forging.

The above embodiment may be modified as described below.

In the above embodiment, among the three pawls 40A to 40C, one of the pawls (first pawl 40A) includes the restriction portion 46A, and the first cam surface 44A and the restriction surface 46As are configured to have the same planar structure. However, the other pawls (second and third pawls 40B and 40C) may also be configured to have the same configuration.

In the above embodiment, the reverse rotation direction RX of the second bracket 31 when the seatback 4 is inclined toward the rear coincides with the biasing direction RB of the cam 50. However, the two directions do not have to coincide with each other. That is, the reverse rotation direction of the second bracket 31 when the seatback 4 is inclined toward the rear may be opposite to the biasing direction RB of the cam 50.

In the above embodiment, the three pawls 40A, 40B, and 40C are arranged in the first bracket 21. However, there is no limit to the number of pawls. Further, when multiple pawls are used, the pawls may be shaped differently from each other or identically with each other as long as they are configured to move in cooperation with each other.

In the above embodiment, the first bracket 21 is fixed to the seat cushion 3, and the second bracket 31 is fixed to the seatback 4. However, the arrangement of the brackets 21 and 31 may be reversed. That is, the first bracket 21 may be fixed to the seatback 4, and the second bracket 31 may be fixed to the seat cushion 3.

The invention claimed is:

1. A seat reclining device comprising:
   a first bracket;
   a second bracket that is rotatable relative to the first bracket;
   a cam that is rotatable relative to the first bracket; and
   pawls moved in a radial direction of the first bracket and engaged with the second bracket by rotation of the cam, wherein
   the pawls include outer teeth that are engageable with the second bracket,
   the second bracket includes an outer circumferential wall, which includes inner teeth that are engaged with the outer teeth of the pawls, and an inner circumferential portion, which extends in a circumferential direction and is located toward an inner side in a radial direction from the outer circumferential wall,
   at least one of the pawls includes a first block that is arranged toward an outer side in the radial direction and a second block that is arranged toward an inner side in the radial direction and located at a position shifted in an axial direction of the cam from the first block, wherein the second block is formed integrally with the first block,
   the first block has a radially outer end surface including the outer teeth,
   the first block has a radially inner end surface including a cam surface that contacts the cam,
   the second block has a radially outer end surface including a restriction surface that contacts the inner circumferential portion when the pawl moves toward the outer side in the radial direction, and
   the cam surface and the restriction surface have the same planar structure.

2. The seat reclining device according to claim 1, wherein
   the cam surface includes a first region, a second region, and a third region that are sequentially arranged in the circumferential direction, wherein the first region and the third region are configured as regions that contact the cam; and
   the restriction surface includes a fourth region that corresponds to the first region, a fifth region that corresponds to the second region, and a sixth region that corresponds to the third region, wherein the fifth region is configured as a region that contacts the inner circumferential portion when the pawl moves toward the outer side in the radial direction.

3. The seat reclining device according to claim 2, wherein the fifth region is formed to be shaped in conformance with an inner circumferential surface of the inner circumferential portion of the second bracket.

4. The seat reclining device according to claim 1, wherein the cam surface at the radially inner end surface of the first block and the restriction surface at the radially outer end surface of the second block are identical in shape with each other, and the cam surface and the restriction surface are located at the same position in the radial direction.

5. The seat reclining device according to claim 1, wherein the at least one of the pawls including the first block and the second block is formed through stamping.

6. A seat reclining device comprising:
   a first bracket;
   a second bracket that is rotatable relative to the first bracket;
   a cam that is rotatable relative to the first bracket; and
   pawls moved in a radial direction of the first bracket and engaged with the second bracket by rotation of the cam, wherein
   the pawls include outer teeth that are engageable with the second bracket,
   the second bracket includes an outer circumferential wall, which includes inner teeth that are engaged with the outer teeth of the pawls, and an inner circumferential portion, which extends in a circumferential direction and is located toward an inner side in a radial direction from the outer circumferential wall,
   at least one of the pawls includes a first block that is arranged toward an outer side in the radial direction and a second block that is arranged toward an inner side in the radial direction, wherein the first block has a radially outer end that includes the outer teeth,
   the first block has a radially inner end surface including a cam surface that contacts the cam,
   the second block has a radially outer end including a restriction surface that contacts the inner circumferential portion when the pawl moves toward the outer side in the radial direction, and
   the cam surface and the restriction surface have the same planar structure,
   regions located at two opposite circumferential sides of a circumferentially middle region of the cam surface each have a cam function,
   the circumferentially middle region of the cam surface is without a cam function, and
   the restriction surface includes a region corresponding to the circumferential middle region of the cam surface and configured as a portion that contacts the inner circumferential portion.

* * * * *